United States Patent [19]

Mifsud

[11] 4,049,077

[45] Sept. 20, 1977

[54] SEISMIC VIBRATOR CONTROL SYSTEM

[75] Inventor: Joseph F. Mifsud, Houston, Tex.

[73] Assignee: Exxon Production Research Company, Houston, Tex.

[21] Appl. No.: 678,502

[22] Filed: Apr. 19, 1976

Related U.S. Application Data

[63] Continuation of Ser. No. 516,329, Oct. 21, 1974, abandoned.

[51] Int. Cl.$^2$ ............................................. G01V 1/04
[52] U.S. Cl. .................................. 181/114; 181/142; 181/401; 340/15.5 TC
[58] Field of Search ......... 340/17, 15.5 TC, 15.5 TA; 181/106, 113, 114, 142, 401

[56] References Cited

U.S. PATENT DOCUMENTS

| | | | |
|---|---|---|---|
| 3,208,550 | 12/1962 | Castanet et al. | 181/.5 |
| 3,219,971 | 11/1915 | Cole | 340/15.5 |
| 3,331,239 | 7/1967 | Larsen et al. | 73/71.6 |
| 3,363,720 | 11/1966 | Mifsud et al. | 181/.5 |
| 3,578,102 | 3/1971 | Ross et al. | 181/401 |
| 3,698,508 | 10/1972 | Landrum, Jr. | 340/15.5 TC |
| 3,795,286 | 3/1974 | Meyer | 181/.5 RC |
| 3,807,525 | 4/1974 | Platt | 340/15.5 TC |
| 3,854,118 | 12/1974 | Pelton | 340/17 R |
| 3,863,202 | 1/1975 | Landrum, Jr. | 340/17 |
| 3,881,167 | 4/1975 | Pelton et al. | 340/15.5 TA |

Primary Examiner—Maynard R. Wilbur
Assistant Examiner—T. M. Blum
Attorney, Agent, or Firm—E. Eugene Thigpen

[57] ABSTRACT

This invention is a control system for a hydraulic vibrator that permits the injection into the ground of seismic signals having pseudo-random code patterns or other broad band signals. Feedback for controlling vibrator operation is taken from the coupling plate. At low frequencies, the feedback is proportional to coupling plate position and at higher frequencies, the feedback is proportional to the coupling plate velocity.

31 Claims, 6 Drawing Figures

SEISMIC VIBRATOR CONTROL SYSTEM

CROSS-REFERENCE TO RELATED APPLICATION

This application is a Continuation of U.S. patent application Ser. No. 516,329, filed Oct. 21, 1974, now abandoned.

BACKGROUND OF THE INVENTION

In order to determine the structure of the earth's subsurface, seismic disturbances are created at or near the earth's surface and the travel time of resulting seismic waves to reflecting subsurface strata and back is measured. One source for generating these seismic waves is the hydraulic type vibrator. Because the impedances of the hydraulic valve, the hydraulic actuator, and the ground change with frequency, it is necessary to employ a servo loop to ensure that the seismic signal imparted into the ground is representative of the electrical input signal that drives the vibrator.

The time lapse between the time the seismic signal is injected into the earth and the return of the reflected seismic wave to the surface is normally determined by correlating the injected wave form with the return wave form and determining points of maximum correlation. One type of servo control loop that has been developed controls only the phase of the injected seismic signal. The one type of seismic signal that has been injected, using this system, is a swept sine wave in which the frequency changes slowly as a function of time. The difficulty that is encountered with a slowly varying sine wave is that, as the injected signal and the reflected signal are correlated, minor lobes, diminishing in amplitude, extend from the major lobe in both directions on the time shift axis of the correlation curve. The side lobes of the correlation curves produced by reflections from a good reflecting horizon may be of sufficient amplitude to mask the major lobe of a small amplitude correlation signal resulting from reflections from a relatively poor reflecting horizon. Also, if only the phase of the injected signal is controlled by the servo loop, it is not possible to compensate for changes in impedances within the vibratory system and the ground, and the desired amplitude of vibration cannot be maintained. Another servo control system that has been developed utilizes only position feedback from the hydraulic valve and the hydraulic actuator. Because the driving point impedance of the earth is rather large, there is going to be some movement of the reaction mass and cylinder relative to the ground. Feedback taken from the hydraulic actuator, which will indicate only relative movement between the piston and cylinder, cannot compensate for movement of the cylinder, and to the extent that the cylinder does move, the injected seismic signal will not be representative of the electrical input signal.

SUMMARY OF THE INVENTION

This vibrator system employs feedback from the hydraulic valve, the hydraulic actuator, and the coupling plate.

The feedback signal from the hydraulic actuator which is representative of the position of the piston within the cylinder maintains the piston at the desired operating point within the cylinder.

In order to inject a seismic signal into the ground that is a more accurate representation of the electrical input signal, feedback is taken from the coupling plate to control the vibrator dynamic operation. Over most of the operating frequency range, velocity feedback is employed. Velocity control is desirable because the recorded seismogram obtained in the field is representative of the velocity of ground movement. Therefore, by controlling the velocity of the vibrator coupling plate, and of the injected seismic disturbance, the waveform of the resulting seismic signal is more accurately controlled. At lower frequencies, the velocity feedback signal will be quite small since velocity is proportional to frequency for a given displacement vibration. Therefore, at low frequencies, a displacement feedback signal from the coupling plate is used to control the vibrator operation.

A position feedback signal is also taken from the hydraulic valve for controlling the electrohydraulic portion of the vibrator. The use of this inner feedback loop makes it easier for the outer control loops to control the motion of the vibrator.

The use of feedback signals for controlling position and velocity produces a faster response time than does phase feedback alone. The fast response time of this servo control loop permits the injection of pseudo-random code or other wide band seismic signals into the ground. The pseudo-random code gives improved seismic data because the correlation of the detected geophone signal with the reference signal will have a larger ratio of peak amplitude to side lobe amplitude.

Also employed in this control system is a high frequency dither input signal. This input signal will prevent static friction from developing within the hydraulic system. A position control input signal is also employed to set the initial position of the piston within the cylinder.

DESCRIPTION OF THE PREFERRED EMBODIMENT

Figure 2:
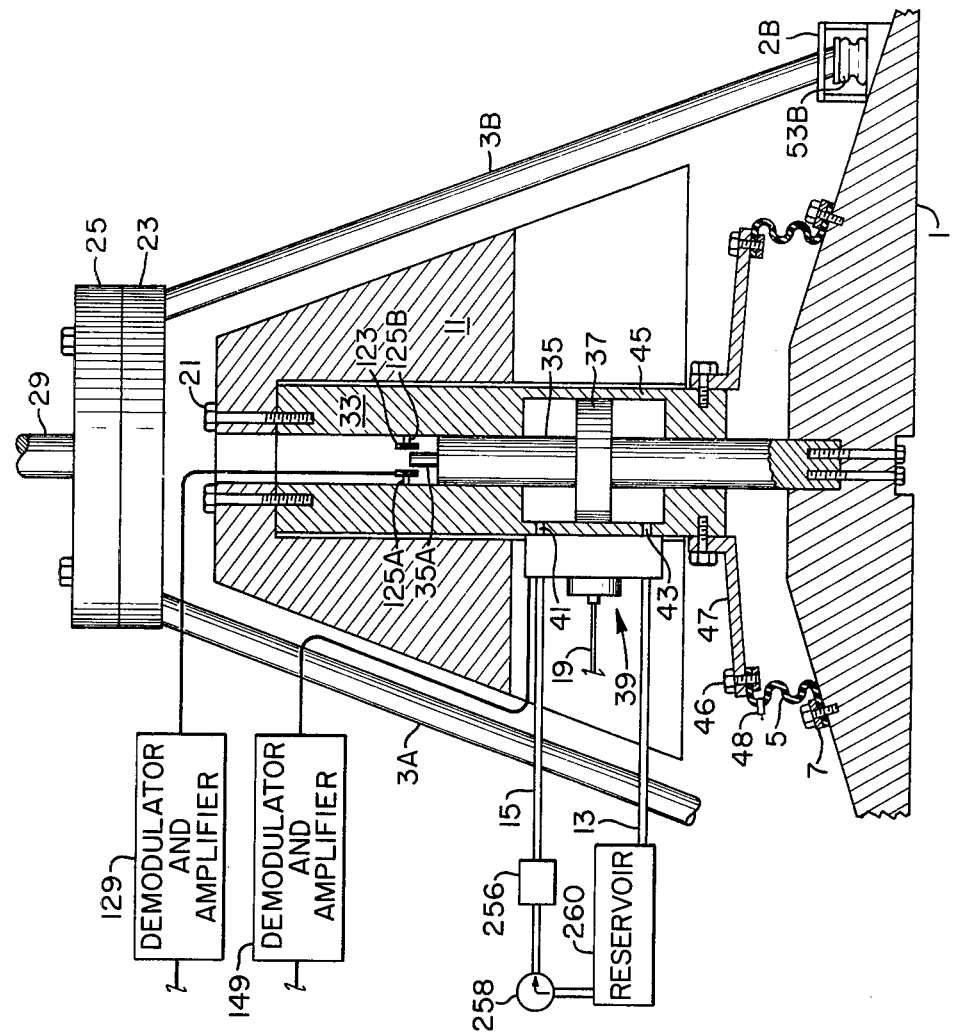
FIG. 2 is a view, partially in cross section and partially in block form, better illustrating the apparatus of FIG. 1.
Figure 1:
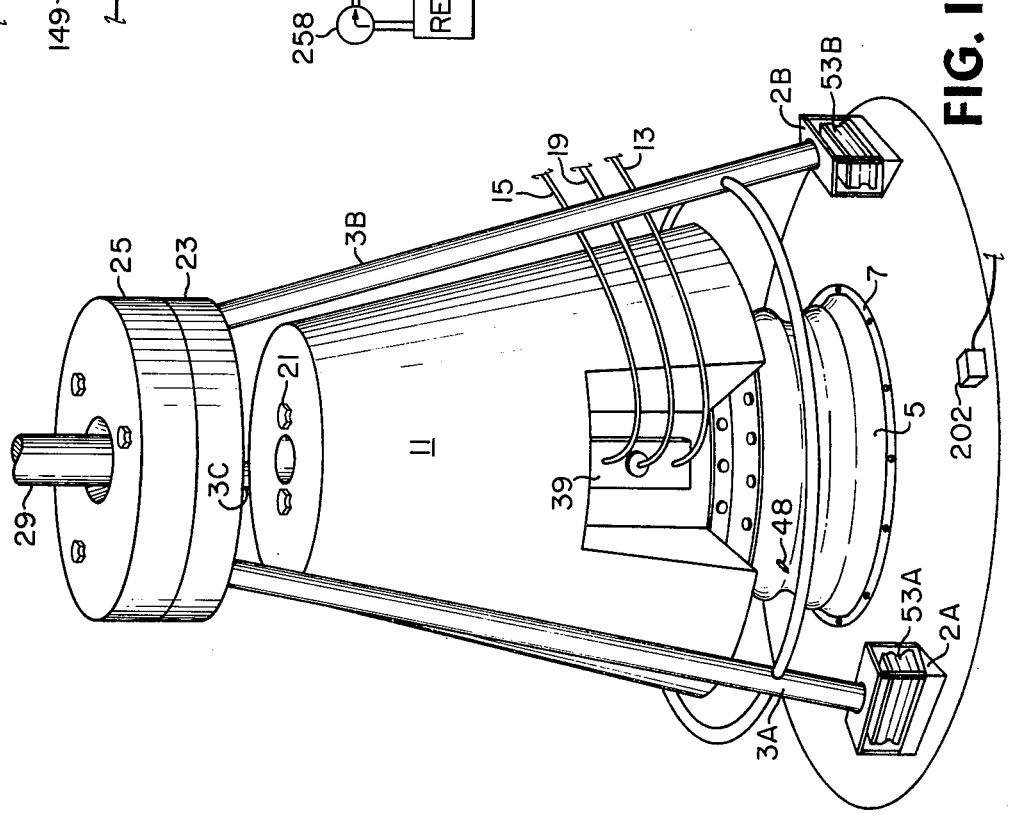
FIG. 1 is a perspective view of a hydraulic vibrator.

The seismic vibrator as illustrated in FIGS. 1 and 2 employs a generally circular coupling plate 1. The coupling plate is held against the ground by the weight of a heavy mass, such as a transporting vehicle or truck, which is transmitted through a substantially vertical shaft 29 having a ball at its lower end which is fitted into the members 23 and 25 of a ball joint housing. A plurality of posts 3A, 3B, and 3C are affixed at their upper ends to the ball joint housing and are connected at their lower ends to air springs 53A, 53B, and 53C (the latter now shown) connected to the coupling plate by housing members 2A, 2B, and 2C.

As illustrated in FIG. 2 a power piston 37 is connected to the coupling plate 1 by means of a connecting rod or shaft 35 adapted for reciprocating movement within the cylindrical space or power piston housing 45.

An annular flange 47 extends outwardly from piston housing member 45, and near its outer edge is affixed, by bolts 46, an air spring member 5. A clamp 7 affixes the lower end of the air spring member 5 to the coupling plate 1.

A Schroeder valve 48 is provided for introducing pressurized air into the closed space defined by the air spring member 5, coupling plate 1, and flange 47. Likewise, Schroeder valves (not shown) can be used to inflate each of the air spring members 53A, 53B, and 53C. The compliance of each of the air springs should be such that the resonant frequency of the springs and the mass of the truck is below the lowest operating frequency of the vibrator, the resonant frequency being defined by the following formula:

$$f_r = 1/2\pi \sqrt{K/M}$$

where:

$K$ = total stiffness of springs 53A, 53B, and 53C, and
$M$ = mass of truck

Before the unit is placed in operation, the air springs 53A, 53B, and 53C are pressurized to a desired pressure to support the weight of the truck on the coupling plate. Furthermore, the closed space within the air spring 5, coupling plate 1, and flange 47, is pressurized to lift the piston housing member 45 to a desired height above the coupling plate 1.

An electrohydraulic servovalve 39 is provided for applying hydraulic pressure to one side or the other of the piston 37 in order to induce reciprocating movement which will be transmitted to the coupling plate 1. The electrohydraulic servovalve 39 is connected to the space within the cylinder of housing member 45 on opposite sides of the piston 37 through ports 41 and 43. High pressure hydraulic fluid is applied to the transducer through conduit 15. Conduit 13 provides drain of the hydraulic fluid from the transducer. Affixed to the upper end 33 of the power piston housing member 45 is a very heavy reaction mass 11 connected to said upper end 33 by means of a plurality of bolts 21. The mass has cutouts at the front and rear in order to provide access to the electrohydraulic transducer 39 and to balance the mass, and a cutout at the top for the leads of transformer 123.

Figure 3:
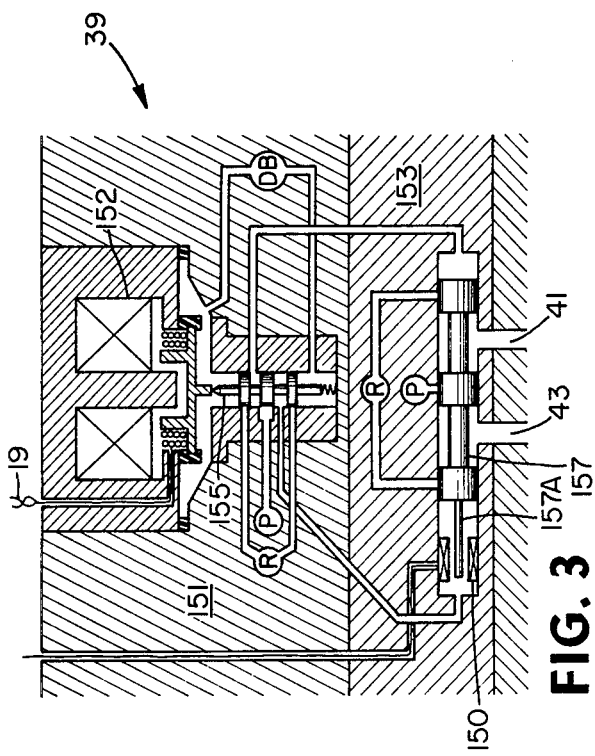
FIG. 3 illustrates the control servo valve for the hydraulic vibrator.

A fragmentary sectional view of a suitable servovalve 39 is shown in FIG. 3. It includes pilot stage 151 and power stage 153. Pilot stage 151 is driven by an electrodynamic driver controlled by an electrical signal on leads 19 to the coil. In the drawing, R indicates return, P indicates pressure, and DB indicates drain-back. P comes from power conduit 15 of FIG. 2 and R is connected to return conduit 13. Power stage 153 includes slave spool 157 and differential transformer 150. The servovalve follows the control signal fed to it through connecting leads 19. A small diameter rod 157A extends outwardly from an end of slave spool 157 and a magnetic slug at the end of the rod is located in the middle of the windings of transformer 150 so that when an AC signal of suitable frequency (typically 13 KC) is placed on the primary, the amplitude of the demodulated signal from the transformer secondary will vary in accordance with the instantaneous position of rod 157A. Electric circuit 149 (see FIG. 2) which may comprise a cascade connected demodulator and amplifier is connected to the secondary leads of transformer 150 to provide a feedback signal for controlling the response of the hydraulic servovalve.

Power is supplied to the servovalve through power conduit 15 as is shown more clearly in FIG. 2. Conduit 15 is connected to an accumulator 256 which is connected to the discharge side of pump 258 which obtains its hydraulic fluid from reservoir 260. Fluid from servovalve 39 is returned to reservoir 260 through conduit 13. There are port means 41 and 43 within the wall of cylinder 45 respectively, above and below piston 37. Servovalve 39 follows the signal fed to it through leads 19 so that it adds and removes hydraulic fluid through port means 41 and 43 respectively, to and from cylinder 45 above and below vibrator piston 37 in accordance with such signal. Thus, when base plate 1 is on the ground, it imparts a signal to the ground which follows the signal fed to the servovalve.

A small diameter rod 35A extends upwardly from the upper end of piston rod 35. A differential transformer 123 is supported by support members 125A and 125B extending inwardly from the inner surface of housing member 45 toward rod 35A. At the end of rod 35A is a magnetic slug in the middle of the windings of transformer 123 so that when an AC signal of suitable frequency (typically 13 KC) is placed on the transformer primary leads, the amplitude of the signal from the transformer secondary will vary in accordance with the instantaneous position of rod 35A. The electrical circuit 129, which may comprise cascade connected demodulator and amplifier is connected to secondary leads to transformer 123 to produce a feedback signal for controlling the relative displacement of the hydraulic piston and cylinder.

Transducer 202, which may be a geophone, is securely fastened to the coupling plate 1, to produce a feedback signal from the coupling plate for controlling the movement of the coupling plate. Alternately, an accelerometer followed by a conventional integrating network may be used instead of the geophone.

Figure 4:
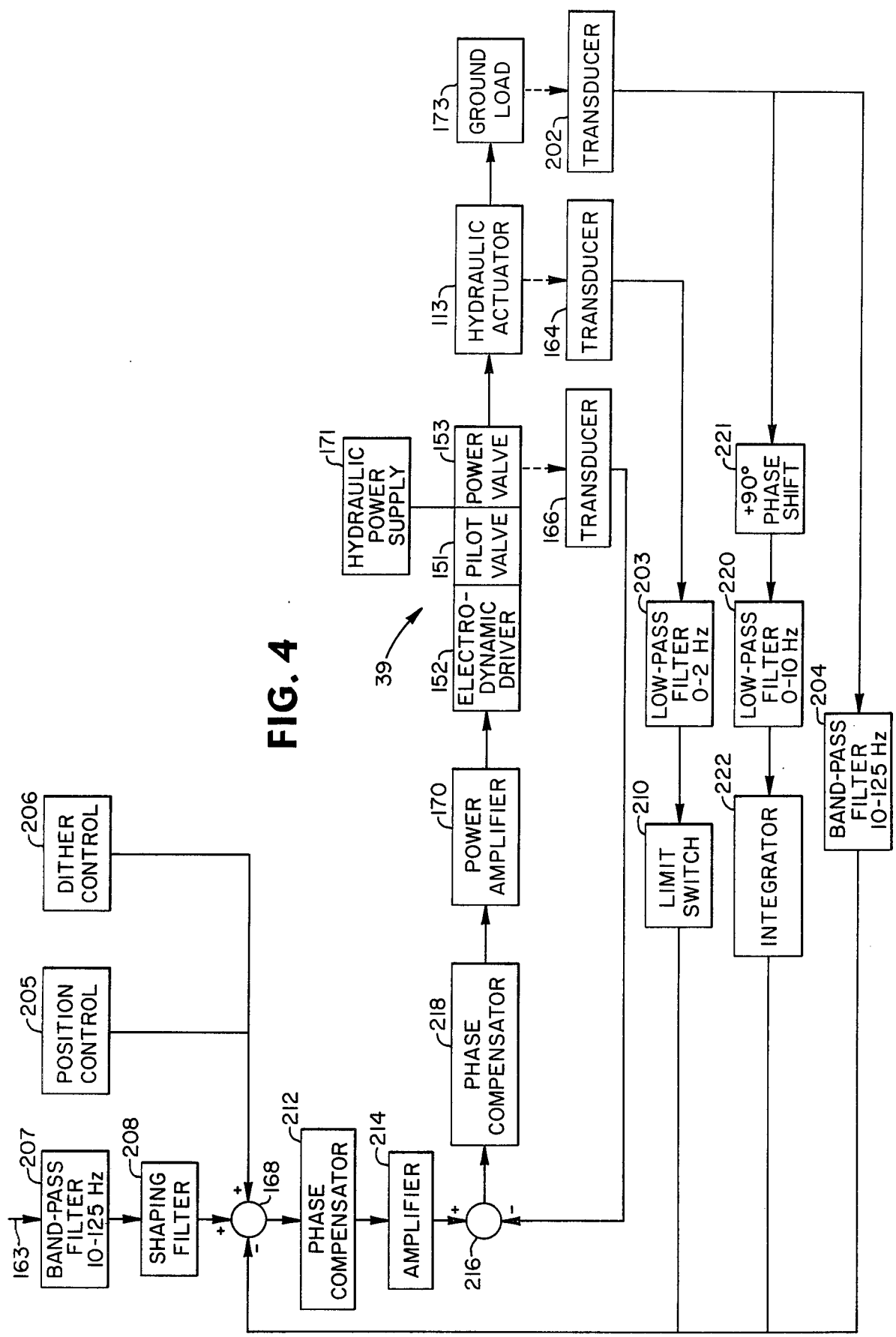
FIG. 4 is a block diagram of the vibrator of FIGS. 1 and 2 and control elements therefor.

With reference now to FIG. 4, there is illustrated a block diagram, partially mechanical and partially electrical, of the apparatus described above with additional circuit elements for controlling the physical operation of the vibrator. The hydraulic power supply 171 includes reservoir 260, conduits 15 and 13, pump 258, and accumulator 256 of FIG. 2. The servovalve 39, including electrodynamic driver 152, pilot valve 151, and power valve 153; and the hydraulic actuator 113 are shown as appropriately connected blocks. The actuator 113 is connected to a load 173, which may be considered as the vibrator coupling plate and the ground under the coupling plate. The hydraulic actuator is also shown connected to a feedback transducer 164 which as mentioned above, comprises the transformer 123 and circuit 129. The power valve is shown connected to feedback transducer 166 which comprises transformer 150 and circuit 149. The coupling plate is shown connected to transducer 202. The feedback paths for transducer 202 are through band pass filter 204 and through a conventional phase shift circuit 221, low pass filter 220, and conventional integrator circuit 222, in series. The feedback path for transducer 164 is through low pass filter 203.

The feedback signals from transducers 164 and 202 are applied to an adder circuit 168 where they are added or combined with the electrical input control signal from input line 163. The input control signal is passed through band pass filter 207 which may be a conventional filter circuit. The output of filter 207 is passed through a shaping filter 208. The output signal from adding circuit 168 is applied to phase compensator 212 and then amplified by amplifier 214. Negative feedback from transducer 166 is combined in adder 216 with the amplifier 214 output. This combined signal is connected to the input of phase compensator 218 and the output of this phase compensator is amplified by power amplifier 170 for driving the electrohydraulic servo.

The overall operation of the apparatus described above is as follows. Assume that a suitable input signal that varies in amplitude and frequency as a function of time is applied to adder 168 for the purpose of driving hydraulic actuator 113. Because the impedances of the hydraulic valve, the hydraulic actuator, and the ground change with frequency, the response of the coupling plate to the control signal would also change with frequency were it not for the action of the feedback transducers. Therefore, the feedback transducers are used to make sure the ground movement under the vibrator coupling plate follows the input signal with good fidelity.

Feedback transducer 166 is a position transducer that generates a signal having an amplitude proportional to the position of the slave spool. The feedback transducer 164 is a position transducer that generates a signal having an amplitude proportional to the position of the piston within the cylinder.

Even though the mass of the truck and of the reaction mass 11 is made very large compared to the mass of the piston 37, rod 35, coupling plate 1 and the earth that is being moved, there is still going to be some movement of the cylinder housing 45 with respect to the earth's surface. Because transducer 164 detects only relative movement between the piston and the cylinder, it is incapable of correcting for movement of the cylinder. Since the purpose of the servo control scheme is to control the motion of the vibrator coupling plate, feedback transducer 202 has been placed on the coupling plate.

As stated previously, velocity control is desirable because the recorded seismogram is representative of the velocity of ground movement, and the waveform of the resulting seismogram is more accurately controlled by controlling the velocity of the injected seismic signal. At low frequencies, however, a velocity feedback signal is quite small, since it is difficult to move the stiff ground at a large velocity at low frequencies. And since the amplitude of a velocity feedback signal is insufficient for controlling the vibrator at low frequencies, a displacement feedback signal is employed. The feedback path for the velocity feedback signal is through band pass filter 204. The lower cutoff frequency of filter 204 is set at a frequency equal to or greater than the lowest frequency at which the velocity feedback signal has sufficient amplitude to control the vibrator. This frequency will normally be within the range of 5–15 Hz, and preferably may be set at 10 Hz as shown in FIG. 4. The upper cutoff frequency is the maximum desired seismic frequency, which may be 125 Hz. The feedback path for the displacement feedback signal is through integrating circuit 222 and low pass filter 220. Integration converts the velocity signal to a displacement signal. The cutoff frequency of filter 220 is set at about the same frequency as the lower cutoff frequency of filter 204 so that displacement feedback does not overlap the frequency range of the velocity feedback. A positive 90° phase shift is introduced by phase shift network 221 to compensate for the phase shift introduced by integrating circuit 222 so that the velocity and displacement feedback signals will be of the same phase.

Feedback from the hydraulic actuator is also needed in order to control the position of the piston within the cylinder. The feedback path is through low pass filter 203 and limit switch 210, in series. The low pass filter 203, which may be of a conventional design, has a pass band from DC up to approximately 2 Hz. The output from low pass filter 203 is essentially a steady state signal and is used to maintain the mean piston motion within the central portion of the cylinder thereby preventing the piston from striking the top or bottom of the cylinder and ensuring the best linear response from the hydraulic system. Limit switch 210, which may be a conventional amplitude threshold detector, responds to signals from transducer 166 that are of sufficient amplitude to indicate that a piston is in danger of striking the top or bottom of the cylinder, and stops the operation of the vibrator by shorting the output of adder 168.

This servo control scheme also employs an inner feedback loop from the power valve transducer 166 to adder 216. The function of this inner feedback loop is to control operation of the servovalve so as to reduce the burden placed on the outer feedback loop. Power valve feedback is generated by transformer 150 whose output indicates the position of slave spool 157. This feedback ensures that the power valve operation tracks the waveform of the input signal to adder 216. Phase compensator 218 is a conventional phase shift network that introduces a shift that is essentially linear as a function of frequency. The purpose of this phase compensator is to compensate for the time shift that occurs in the amplifier 170 and the electrohydraulic servovalve 39.

Phase compensator 212 is employed to compensate for the time delay occuring in amplifier 214, the hydraulic actuator, and that introduced by the ground impedance.

The input control signal on line 163 is an electrical signal representative of the desired seismic signal. This signal input is filtered by filter 207 having a pass band equal to the seismic frequency band of interest, which may be 10–125 Hz as shown. Because the earth attentuates high frequencies more than low frequencies, it is desirable that high frequency vibrations have a high amplitude than lower frequency vibrations. Therefore, the input control signal is also modulated by shaping filter 208, the gain of which increases with increasing frequency. In addition, shaping filter 208 may include a notch filter to reduce the amplitude of an undesirable resonance frequency in the hydraulic vibrator ground system. The output of the shaping filter is connected to the input of adder 168. Adder 168 has, as additional inputs, negative feedback signals described above and input signals from dither control 206 and position control 205.

Figure 6:
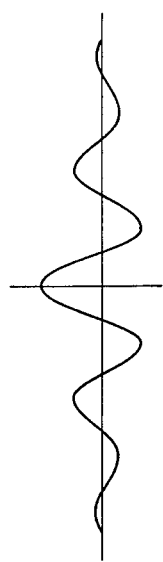
FIG. 6 illustrates a typical correlation function for a swept sine wave.
Figure 5:
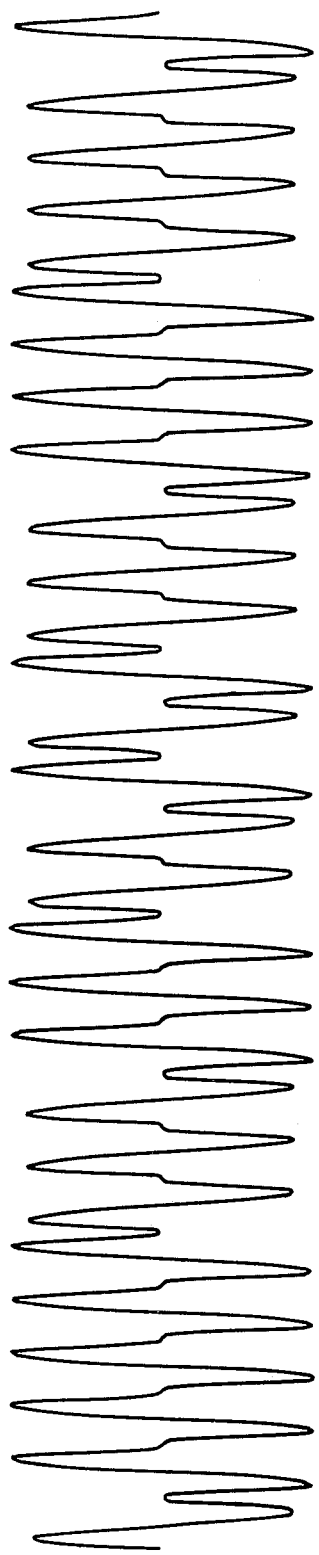
FIG. 5 illustrates the wave form of part of a typical pseudo-random code.

The use of velocity feedback from the vibrator coupling plate permits a broad band seismic signal having rapidly varying frequency components to be injected into the ground. Signals of short duration containing a lot of frequency components, such as the pseudo-random signal illustrated in FIG. 5 can be employed. The correlation of the detected geophone signal with a reference signal of this type will have a larger ratio of peak to side lobe amplitude than that resulting from a swept sine wave, illustrated in FIG. 6. This will permit the detection of peak lobes of small amplitude resulting from reflections from relatively poor reflecting horizons that may be located near a good reflecting horizon, resulting in more accurate mapping of subsurface structure.

The output from position control signal source 205, which is a DC voltage, can be varied in order to set the initial position of the piston 37 within the cylinder 45. The input signal to adder 168 from the dither control source 206 is for the purpose of maintaining small amplitude high frequency movements of the piston 37 in order to prevent the static friction that would have to be overcome if the piston were to come to a full stop within the cylinder. The frequency of the dither control signal may preferably be approximately 2 KHz.

What is claimed is:

1. An improved apparatus for controlling the operation of seismic vibrator, said vibrator including a coupling plate, the movement of which is responsive to an electrical input signal, the improvement comprising a feedback loop which includes:
   means for generating an electrical feedback signal which includes a transducer coupled to said coupling plate, said feedback signal having an amplitude which varies instantaneously with coupling plate motion;
   summing means having said electrical input signal connected to a first input terminal thereto and said feedback signal having an amplitude which varies instantaneously with coupling plate motion connected to a second input terminal thereto; and
   phase compensator means connected in series circuit relation within said feedback loop.

2. The apparatus of claim 1 wherein said feedback signal is proportional to coupling plate velocity and said transducer comprises a geophone mounted on said coupling plate.

3. The apparatus of claim 1 wherein said feedback signal is proportional to coupling plate displacement and said transducer comprises a geophone mounted on said coupling plate and said means for generating an electrical feedback signal further includes an integrator circuit in series with said geophone.

4. The apparatus of claim 1 wherein said feedback signal is proportional to coupling plate velocity and said transducer comprises an accelerometer mounted on said coupling plate and an integrator circuit in series with said accelerometer.

5. The apparatus of claim 1 wherein said feedback signal is proportional to coupling plate displacement and said transducer comprises an accelerometer mounted on said coupling plate and an integrator circuit in series with said accelerometer and said means for generating an electrical feedback signal further includes a second integrator circuit in series with said first integrator circuit.

6. The apparatus of claim 1 wherein said vibrator comprises hydraulic actuator means including a piston and cylinder, electrohydraulic means for generating reciprocating movement of said piston responsive to said electrical input signal and said coupling plate is connected to the lower end of said piston, further comprising:
   means for generating an electrical feedback signal having an amplitude proportional to the average position of said piston within said cylinder; and
   said summing means sums said feedback signal having an amplitude proportional to the average position of said piston within said cylinder with said feedback signal having an amplitude which varies instantaneously with coupling plate motion and said electrical input signal.

7. An improved apparatus for controlling the operation of a seismic vibrator, said vibrator comprising hydraulic actuator means including a piston and cylinder, a coupling plate connected to the lower end of said piston, and electrohydraulic means including a slave spool for generating a reciprocating movement of said piston responsive to an electrical input signal, the improvement comprising a feedback loop which includes
   means for generating an electrical feedback signal which includes a transducer coupled to said coupling plate, said feedback signal having an amplitude which varies instantaneously with coupling plate motion;
   summing means having said electrical input signal connected to a first input terminal thereto and said feedback signal having an amplitude which varies instantaneously with coupling plate motion connected to a second input terminal thereto; and
   phase compensator means in series circuit relation within said feedback loop.

8. The apparatus of claim 7 further including means for generating an electrical feedback signal having an amplitude proportional to the average position of said piston within said cylinder; and
   said summing means sums said electrical feedback signal having an amplitude proportional to the average position of said piston within said cylinder with said feedback signal having an amplitude which varies instantaneously with coupling plate motion and said electrical input signal.

9. The apparatus of claim 8 further including an inner feedback loop comprising:
   means for generating a feedback signal having an amplitude proportional to the position of said slave spool; and
   second summing means for summing said feedback signal having an amplitude proportional to the position of said slave spool with an electrical signal derived from said first summing means output.

10. An improved apparatus for controlling the operation of a seismic vibrator, said vibrator comprising hydraulic actuator means including a piston and cylinder, a coupling plate connected to the lower end of said piston, and electrohydraulic means including a slave spool for generating reciprocating movement of said piston responsive to an electrical input signal, the improvement comprising a feedback loop which includes:
   means for generating a first electrical feedback signal having an amplitude proportional to the velocity of said coupling plate over a first frequency range, said first frequency range having a lower limit not lower than the minimum frequency at which a velocity feedback signal is of sufficient amplitude to control the vibrator operation;
   means for generating a second electrical feedback signal having an amplitude proportional to the displacement of said coupling plate over a second frequency range, said second frequency range having an upper limit equal to about the lower limit of said first frequency range;
   summing means having said first and second electrical feedback signals and said electrical input signal connected to input terminals thereof; and
   phase compensator means connected in series circuit relation within said feedback loop.

11. The apparatus of claim 10 wherein said means for generating said first and second feedback signals includes a transducer mounted on the coupling plate.

12. The apparatus of claim 10 wherein said means for generating said first electrical feedback signal comprises:
 a geophone mounted on said coupling plate;
 a band pass filter in series with said geophone; and
 said means for generating a second feedback signal comprises:
 said geophone;
 a plus ninety degrees phase shifting circuit in series with said geophone;
 a low pass filter in series with said ninety degrees phase shifting circuit, and
 an integrating circuit in series with said low pass filter.

13. The apparatus of claim 10 wherein said means for generating said first feedback signal comprises:
 an accelerometer mounted on said coupling plate;
 a first integrating circuit in series with said accelerometer;
 a band pass filter in series with said first integrating circuit; and
 said means for generating a second feedback signal comprises:
 said accelerometer;
 said first integrating circuit in series with said accelerometer;
 a plus 90° phase shifting circuit in series with said first integrating circuit;
 a low pass filter in series with said 90° phase shifting circuit; and
 a second integrating circuit in series with said low pass filter.

14. The apparatus of claim 10 further including:
 position control means having a selectable DC voltage output for positioning the piston within the cylinder;
 dither control means having an essentially constant high frequency output; and
 said first summing means sums said selectable DC output from said positioning control means and said dither control output with said first and second electrical feedback signals and said input signal.

15. The apparatus of claim 10 wherein the lower limit of said first frequency range is between 5 and 15 Hz.

16. The apparatus of claim 10 wherein the lower limit of said first frequency range is about 10 Hz.

17. The apparatus of claim 10 wherein:
 means are included for generating a third electrical feedback signal having an amplitude proportional to the average position of said piston within said cylinder and opposite in phase to said input signal; and
 said first summing means sums said third electrical feedback signal together with said first and second feedback signals and said input signal.

18. The apparatus of claim 17 wherein said means for generating a third feedback signal includes:
 a first transformer mounted within said cylinder;
 a demodulator in series with the secondary of said first transformer; and
 a second low pass filter connected in series with said demodulator.

19. The apparatus of claim 18 wherein said low pass filter has a cutoff frequency of about 2 Hz.

20. The apparatus of claim 17 further including an inner feedback loop comprising:
 means for generating a fourth feedback signal having an amplitude proportional to the position of said slave spool; and
 second summing means for combining said fourth feedback signal with an electrical signal derived from said first summing means output so as to control said electrohydraulic means.

21. The apparatus of claim 20 wherein said means for generating a fourth feedback signal includes:
 a second transformer mounted so as to sense the movement of said slave spool; and
 a demodulator in series with the secondary of said second transformer.

22. The apparatus of claim 20 further including a second phase compensator circuit in series with the output of said second summing means.

23. In a method for injecting a seismic disturbance into the earth by means of a vibrator which includes a coupling plate the motion of which is responsive to an electrical input signal and at least one feedback loop is utilized to control coupling plate motion, the improvement comprising:
 generating an electrical feedback signal from a transducer coupled to said coupling plate having an amplitude which varies instantaneously with coupling plate motion;
 summing said electrical feedback signal having an amplitude proportional to coupling plate motion with said electrical input signal to generate a drive signal for said vibrator; and
 phase shifting said drive signal to compensate for phase shift within said vibrator.

24. The method of claim 23 wherein the amplitude of said feedback signal is proportional to the velocity of said coupling plate.

25. The method of claim 23 wherein the amplitude of said feedback signal is proportional to the displacement of said coupling plate.

26. In a method for controlling the operation of a hydraulic vibrator comprising a hydraulic actuator means including a piston and cylinder, a coupling plate connected to the lower end of said piston, and electrohydraulic means including a slave spool for generating motion of said piston responsive to an electrical input signal, wherein at least one feedback signal is utilized to control coupling plate motion, the improvement comprising:
 generating an electrical feedback signal from a transducer coupled to said coupling plate having an amplitude which varies instantaneously with coupling plate motion;
 summing said electrical feedback signal having an amplitude which varies instantaneously with coupling plate motion with said electrical input signal to generate a drive signal for said vibrator, and
 phase shifting said drive signal to compensate for phase shift within said vibrator.

27. The method of claim 26 wherein the amplitude of said feedback signal is proportional to the velocity of said coupling plate.

28. The method of claim 26 wherein the amplitude of said feedback signal is proportional to the displacement of said coupling plate.

29. The method of claim 26 further including generating an electrical feedback signal having an amplitude proportional to the average position of said piston within said cylinder and summing said electrical feedback signal having an amplitude proportional to the average position of said piston within said cylinder with said feedback signal having an amplitude which varies instantaneously with coupling plate motion and said electrical input signal.

30. The method of claim 29 further including generating an electrical feedback signal having an amplitude proportional to the displacement of said slave spool and summing said electrical feedback signal having an amplitude proportional to the displacement of said slave spool with an output signal resulting from the summation of said electrical input signal, said electrical feedback signal having an amplitude which varies instantaneously with coupling plate motion and said feedback signal having an amplitude proportional to the average position of said piston within said cylinder.

31. In a method for controlling the operation of a hydraulic vibrator comprising a hydraulic actuator means including a piston and cylinder, a coupling plate connected to the lower end of said piston, an electrohydraulic means including a slave spool for generating motion of said piston responsive to an electrical input signal, wherein at least one feedback loop is utilized to control coupling plate motion, the improvement comprising:

generating an electrical feedback signal having an amplitude proportional to the velocity of said coupling plate over a first frequency range having a lower limit not lower than the minimum frequency at which said velocity feedback signal has sufficient amplitude for controlling the vibrator;

generating an electrical feedback signal having an amplitude proportional to the displacement of said coupling plate over a second frequency range having an upper limit at about the frequency to the lower limit of said first frequency range;

summing said electrical feedback signal having an amplitude proportional to the velocity of said coupling plate and said electrical feedback signal having an amplitude proportional to the displacement of said coupling plate with said electrical input signal to generate a drive signal for said vibrator; and phase shifting said drive signal to compensate for phase shift within said vibrator.

* * * * *